United States Patent
Heyer et al.

(10) Patent No.: US 9,309,986 B2
(45) Date of Patent: Apr. 12, 2016

(54) ELECTROMAGNETICALLY ACTUATED VALVE

(75) Inventors: Klaus Heyer, Freiberg (DE); Frank Kaestner, Bietigheim-Bissingen (DE); Norbert Alaze, Markgroeningen (DE); Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 14/118,465

(22) PCT Filed: Apr. 10, 2012

(86) PCT No.: PCT/EP2012/056395
§ 371 (c)(1),
(2), (4) Date: Nov. 18, 2013

(87) PCT Pub. No.: WO2012/167967
PCT Pub. Date: Dec. 13, 2012

(65) Prior Publication Data
US 2014/0084196 A1 Mar. 27, 2014

(30) Foreign Application Priority Data
Jun. 7, 2011 (DE) .......................... 10 2011 077 069

(51) Int. Cl.
*F16K 31/06* (2006.01)
*H02K 33/04* (2006.01)
*B60T 8/36* (2006.01)

(52) U.S. Cl.
CPC ............. *F16K 31/0675* (2013.01); *B60T 8/363* (2013.01); *F16K 31/0658* (2013.01); *F16K 31/0665* (2013.01)

(58) Field of Classification Search
CPC ............ F16K 31/0658; F16K 31/0665; F16K 31/0675

USPC .................. 251/129.01, 129.15, 337; 310/23; 335/281, 297, 299
See application file for complete search history.

(56) References Cited

U.S. PATENT DOCUMENTS

| 1,323,778 | A | * | 12/1919 | Lemp | 239/585.2 |
| 2,631,612 | A | * | 3/1953 | Buescher | 251/85 |

(Continued)

FOREIGN PATENT DOCUMENTS

| DE | 100 64 169 A1 | 2/2002 |
| DE | 103 11 486 A1 | 4/2004 |

(Continued)

OTHER PUBLICATIONS

International Search Report corresponding to PCT Application No. PCT/EP2012/056395, mailed Jun. 20, 2012 (German and English language document) (5 pages).

*Primary Examiner* — Marina Tietjen
*Assistant Examiner* — Seth W Mackay-Smith
(74) *Attorney, Agent, or Firm* — Maginot, Moore & Beck LLP

(57) ABSTRACT

An electromagnetically actuated valve includes at least one sleeve and a magnet armature. A magnetic core is arranged in a stationary manner in the at least one sleeve. The magnet armature is configured to actuate a valve element and is axially movable. An elastically deformable spring element is clamped and retained between a core end face of the magnetic core facing the magnet armature and an armature end face of the magnet armature facing the magnetic core. The spring element forms at least one contact point in conjunction with the armature end face and the core end face. The contour of the spring element, the armature end face and/or the core end face are formed in the radial extent such that a radial position of the at least one contact point changes as a function of a distance of the armature end face from the core end face.

19 Claims, 3 Drawing Sheets

(56) References Cited

U.S. PATENT DOCUMENTS

| | | | |
|---|---|---|---|
| 3,484,076 A * | 12/1969 | Naumann | 251/129.15 |
| 3,653,630 A * | 4/1972 | Ritsema | 251/129.15 |
| 3,729,025 A * | 4/1973 | Silvestrini | 137/625.33 |
| 6,837,478 B1 * | 1/2005 | Goossens et al. | 251/129.15 |
| 7,108,242 B2 * | 9/2006 | Goossens et al. | 251/129.15 |
| 8,100,382 B2 * | 1/2012 | Robertson et al. | 251/129.17 |
| 8,448,916 B2 * | 5/2013 | Kratzer | 251/129.18 |
| 2002/0088493 A1 * | 7/2002 | Suzuki | 137/487.5 |
| 2006/0097210 A1 * | 5/2006 | Fong et al. | 251/129.15 |

FOREIGN PATENT DOCUMENTS

| | | |
|---|---|---|
| EP | 1 232 082 B1 | 8/2002 |
| JP | 49-109938 A | 10/1974 |
| JP | 59-159477 A | 9/1984 |
| JP | 2004-162769 A | 6/2004 |
| JP | 2006-38030 A | 2/2006 |

* cited by examiner

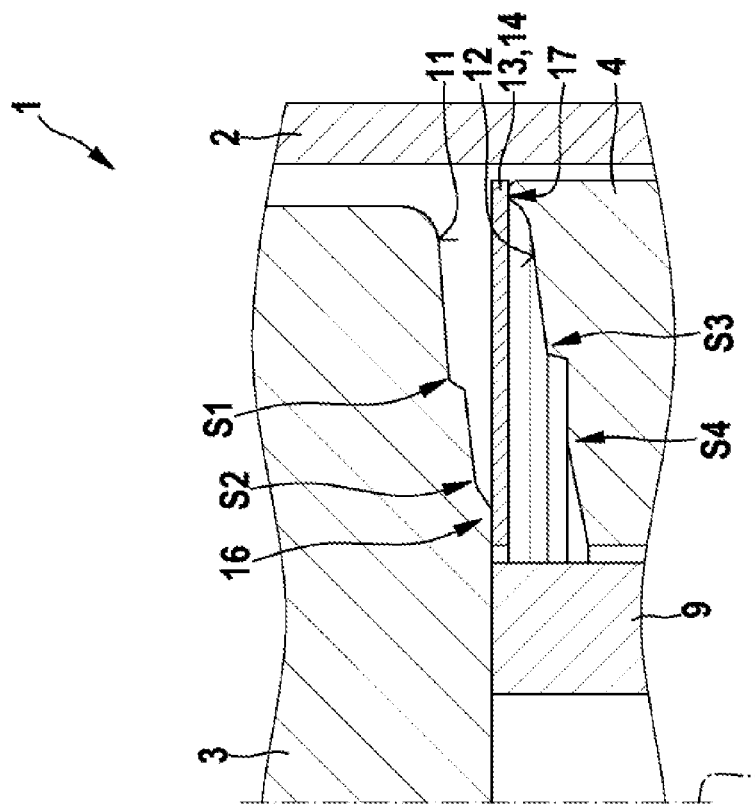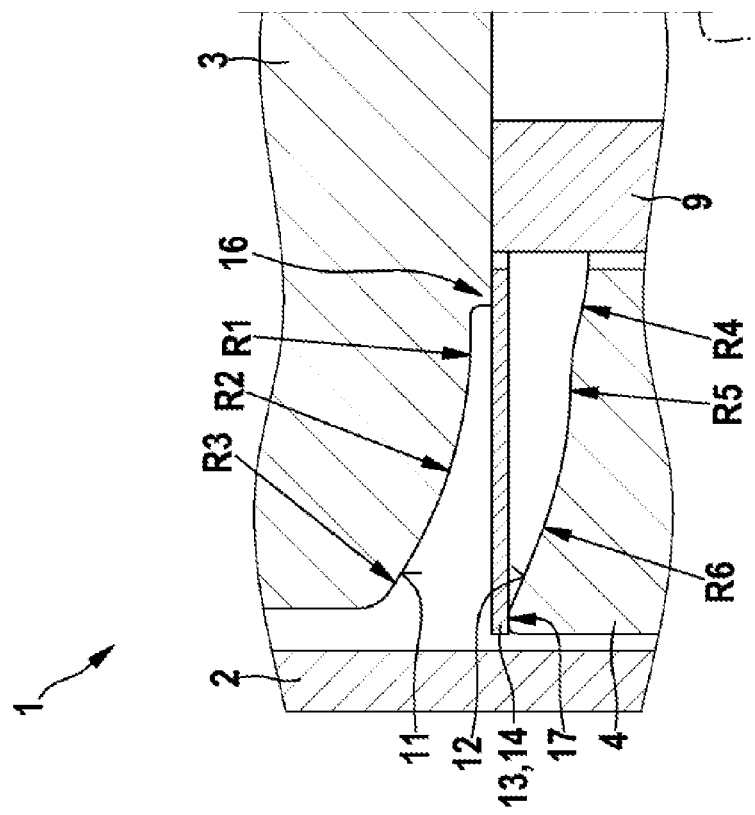

ELECTROMAGNETICALLY ACTUATED VALVE

This application is a 35 U.S.C. §371 National Stage Application of PCT/EP2012/056395, filed on Apr. 10, 2012, which claims the benefit of priority to Serial No. DE 10 2011 077 069.0, filed on Jun. 7, 2011 in Germany, the disclosures of which are incorporated herein by reference in their entirety.

The disclosure relates to an electromagnetically actuated valve, in particular for hydraulic systems of motor vehicles, in accordance with the description below.

BACKGROUND

Valves of this kind are known from the prior art and are often used in hydraulic systems of motor vehicles, especially in hydraulic systems that are relevant to safety, e.g. in brake systems or the like. Thus, European Patent EP 1 232 082 B1, for example, discloses an electromagnetically actuated valve which comprises a magnet core that is arranged in a fixed manner in a sleeve and, when put into operation, exerts a magnetic force on a magnet armature arranged so as to be axially movable in the sleeve. In this case, the magnet armature is connected to a valve element in order to actuate the latter, wherein the valve element exposes a throughflow opening of the solenoid valve when actuated. To actuate the valve, the magnet armature is normally attracted by the magnet core, with the result that the distance between the magnet armature and the magnet core decreases and the valve element is pulled out of a valve seat. This is, therefore, what is referred to as a normally closed valve, which ensures reliable closure of the throughflow opening in the deenergized, i.e. unactuated, state. Moreover, a spring element is provided between the magnet armature and the magnet core, said spring element being elastically deformable and being held in a clamped or clampable manner between the magnet core and the magnet armature. For this purpose, the spring element rests against a core end face of the magnet core facing the magnet armature and against an armature end face of the magnet armature facing the magnet core, whereby at least one contact point on the armature end face and on the core end face are formed in each case. By means of the spring element, the magnet armature and hence the valve element are pushed into the closed position.

As also described in EP 1 232 082 B1, the end faces, i.e. the armature end face and the core end face, are normally designed in such a way that they extend obliquely outward in the radial extent, i.e. from the central axis or axis of rotation, with the result that, when viewed in a longitudinal section through the valve, the end faces have a substantially V-shaped contour which, inter alia, allows the local penetration of the magnet core into the magnet armature, for example, thereby ensuring a small spacing and thus efficient exploitation of the magnetic forces.

SUMMARY

The electromagnetically actuated valve according to the disclosure is distinguished by the features described below. The (solenoid) valve according to the disclosure has the advantage that the effective spring force between the magnet core and the magnet armature changes as a function of the valve stroke, thereby producing or accentuating a progressive force/displacement characteristic profile of the spring element. The valve according to the disclosure is distinguished by the fact that the contour of the spring element, of the armature end face and/or of the core end face is shaped in such a way in the radial extent that the radial position of at least one of the contact points changes as a function of the distance between the armature end face and the core end face. Through an appropriate choice of geometry or contour for the end faces and/or for the spring element, it is possible to ensure that at least one of the contact points shifts radially as a function of the valve stroke or of the distance between the end faces. The contours are preferably chosen in such a way that the at least one contact point shifts in such a way as the distance between the end faces decreases that the spring force is increased. This ensures advantageous damping of the movement of the magnet armature during the actuation thereof. Here, the contour of the respective element in the radial extent should be taken in all cases to mean the extent of the element starting from the center or the axis of rotation. As a preferred option, the contour of the spring element is shaped in an appropriate manner, while the contours of the end faces extend in a straight line or perpendicular to the axis of movement of the magnet armature. According to an alternative preferred embodiment, at least one of the end faces is shaped in an appropriate manner, while the spring element is configured as a flat spring element or spring element which lies in a plane, in particular in a plane perpendicular to the axis of movement of the magnet armature.

According to an advantageous development of the disclosure, it is envisaged that the spring element, the armature end face and/or the core end face or the contours thereof are shaped in such a way that the distance between the contact points changes as a function of the distance between the armature end face and the core end face, at least when viewed in the radial direction. This ensures that the spring or lever travel of the spring element changes as a function of the distance between the end faces, with the result that the spring force changes even when the spring disk has the same thickness/density over the entire extent thereof. If the thickness of the spring disk varies in the radial extent, the spring force changes in addition to the shortening of the lever arm.

As a particularly preferred option, the spring element in each case forms a multiplicity of contact points in the form of a contact line or a contact surface with the armature end face and/or with the core end face respectively. As a particularly preferred option, the contact line or the contact surface extend over the entire circumference of the, preferably circular, spring element, thus giving rise to uniform loading and force distribution or transmission. It is expedient if the core end face, the armature end face and the spring element are of rotationally symmetrical configuration.

The spring element is preferably configured as a disk spring, in particular a flat disk spring, which is, in particular, of ring-shaped configuration, with the result that it has an opening in the center. Disk springs of this kind are widely available, and therefore the use thereof permits a particularly low cost embodiment of the valve.

According to an advantageous development of the disclosure, provision is made for the respective contour to be of curved or stepped configuration in the radial extent. The curvature of the contour or the stepping is a simple way of allowing the contact points to shift relative to one another as a function of the distance between the end faces. Depending on the embodiment, the contact points can be varied continuously or in steps. In the case of the stepped configuration of the contour, in particular, there is a stepwise change in the contact points, while, in the case of a curved configuration, a continuous shift in the contact points along the respective end face can also be achieved. A hybrid form is, of course, also conceivable, in which at least one of the end faces and/or the spring element has both a curved and a stepped shape in the radial extent.

The respective curvature preferably has at least one radius, preferably a plurality of different successive radii. It is thereby possible in a simple manner to set the desired force/displacement characteristic of the spring element.

The respective stepped contour has at least one, preferably a plurality of, successive steps, which are equally or differently graduated and are equally or differently spaced. Here, graduation should be taken to mean the height of the steps. Thus, the force/displacement characteristic of the spring element is influenced not only by the distance between a plurality of steps but also by the height of the respective steps.

According to a preferred embodiment of the disclosure, provision is made for the armature end face and the core end face to be configured so as to be at least substantially complementary to one another. Despite the provision of the curvature or of the at least one step, this enables the magnet core and the magnet armature to engage in one another, at least locally, in order to allow a minimum distance between the end faces. This ensures that the "air gap" between the magnet armature and the magnet core is kept small and the magnetic force is exploited in the optimum manner.

According to an advantageous development of the disclosure, provision is made for the spring element to be configured as a diaphragm spring and the core end face and/or the armature end face to be of curved or stepped configuration. Thus, provision is made here, in addition to a curvature or step in at least one of the end faces, for the spring element to have a profile which departs from the disk-shaped configuration in the radial extent and, to this extent, to itself form a contour in the radial extent which is not perpendicular to the axis of rotation. In this case, the contour can be formed obliquely or even be curved or stepped.

BRIEF DESCRIPTION OF THE DRAWINGS

Further embodiments will become apparent from the illustrative embodiments shown in the figures and described below. Here:

FIGS. 2A and 2B show an advantageous illustrative embodiment, and

DETAILED DESCRIPTION

Figure 1:
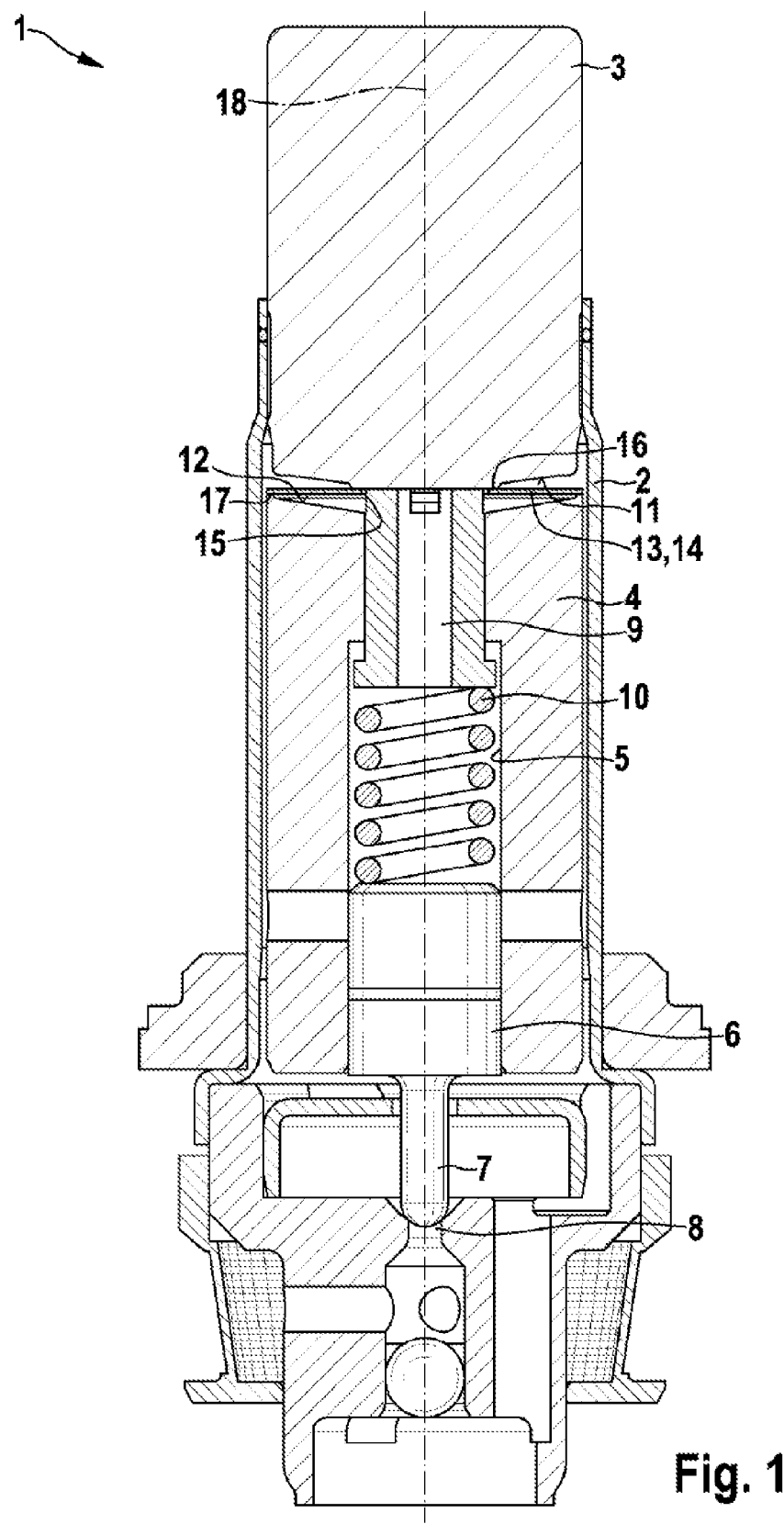
FIG. 1 shows an electromagnetically actuated valve in longitudinal section.

FIG. 1 shows an electromagnetically actuated valve 1 in longitudinal section, it being possible to install this valve especially in hydraulic systems of motor vehicles. The valve 1 has a substantially cylindrical sleeve 2, which carries at one end a magnet core 3 connected to the sleeve 2 in a fixed manner. Assigned to the magnet core 3 is a coil (not shown specifically here), through the energization of which the magnet core 3 attracts a magnet armature 4 arranged in the sleeve so as to be axially movable.

The magnet armature 4 has a stepped through hole 5, in which a valve element 6 is held on the side facing away from the magnet core 3, said valve element having a valve tip 7 which interacts with a valve seat or with a valve opening 8 in order to close or open a throughflow cross section. Also held in the through hole 5 is an axially movable pressure piece 9, one end of which is acted upon by a spring element configured as a helical spring 10 supported at one end on the valve element 6 and at the other end on the magnet core 3. In this case, the magnet core 3 has a rotationally symmetrical core end face 11 facing the magnet armature 4, and the magnet armature 4 has a rotationally symmetrical armature end face 12 facing the magnet core 3. The pressure piece 9 projects beyond the armature end face 12 and rests centrally against the core end face 11.

A further, elastically deformable spring element 13 is provided between the magnet core 3 and the magnet armature 4, in the present case being configured as a rotationally symmetrical disk spring 14 and being held in a clamped or preloaded manner between the core end face 11 and the armature end face 12. In the initial position illustrated, i.e. in the unactuated state, however, the spring element 13 does not necessarily have to be held in a preloaded or clamped manner. According to an alternative embodiment, the embodiment can also be implemented in such a way that the spring element 13 is clamped between the two end faces 11 and 12 only when the valve 1 is actuated. In the center, the disk spring 14 has an opening 15, through which the pressure piece 9 projects in order to rest against the core end face 11.

In the center, the core end face 11 has a region in which the core end face 11 extends perpendicular to the axis of the valve 1 and on which the pressure piece 9 rests. This region has a radius which extends beyond the pressure piece 9 and thus forms a supporting surface for the disk spring 14. On its armature end face 12, the magnet armature 4 has an outer region in which the armature end face 12 is likewise aligned substantially perpendicular to the axis 18 of the valve (indicated by a chain-dotted line). In this case, this region is of ring-shaped configuration and is situated at the outermost edge of the armature end face 12. The disk spring 14 rests on said region by means of the outer edge region thereof. With the magnet armature 4 and the magnet core 3, the disk spring 14 thus forms respective contact points 16 and 17, which are configured as ring-shaped supporting surfaces in the present illustrative embodiment. Otherwise, the core end face 11 and the armature end face 13 are configured to extend obliquely in the radial extent, i.e. starting from the axis of the valve 1, wherein the obliquely extending regions extend substantially parallel to one another, with the result that the core end face 11 and the armature end face 12 are to this extent of complementary configuration.

During operation, when the solenoid valve is energized or actuated, the magnet core 3 attracts the magnet armature 4, whereby the disk spring 14 held clamped therebetween is deformed and thereby produces a spring force which acts between the magnet core 3 and the magnet armature 4.

FIG. 2 shows an enlarged detail of the valve 1 in accordance with two preferred embodiments, wherein a first illustrative embodiment is shown to the left of the axis 18 of the valve 1 (FIG. 2A) and a second illustrative embodiment is shown to the right of the axis (FIG. 2B).

The two preferred illustrative embodiments have in common that the core end face 11 and the armature end face 12 are configured in such a way that the radial position of the contact points between the disk spring 14 and the two end faces 11, 12 changes as a function of the distance between the armature end face 12 and the core end face 11. For this purpose, the end faces 11, 12 have a corresponding contour in the radial extent, wherein, according to FIG. 2A, the contour is formed by a plurality of successive radii R1 to R3 and R4 to R6, respectively, and, according to FIG. 2B, is formed by a plurality of successive steps S1 and S2 and S3 and S4, respectively, while the disk spring 14 is in the form of a planar or flat disk spring 14.

In the illustrative embodiment shown in FIG. 2A, the contour of the respective end faces 11, 12 is therefore of curved configuration, wherein a plurality of successive radii is provided in order to form the curvature. It is expedient if radii R1 to R3 and radii R4 to R6 are each different and, as a particularly preferred option, they have different starting points, as indicated in FIG. 2A. As mentioned above, the contours of the end faces 11, 12 are configured in such a way that at least one of the contact points, preferably both contact points, shift radially when the distance between the magnet core 3 and the magnet armature 4 changes. An appropriate choice of radii R1 to R6 ensures that, for example, contact point 16 or the corresponding contact surface shifts from the inside outward when the magnet armature 4 approaches the magnet core 3 and the "air gap" between the magnet armature 4 and the magnet core 3 is decreased or is reduced. Thus, for example, contact point 16 shifts from radius 1 to radius 2, as far as radius 3 on the core end face 11. At the same time, contact point 17 shifts radially from the outside inward across radii R6, R5 and R4. The contours are preferably chosen in such a way that the distance between contact points 16 and 17 is reduced as the air gap decreases, with the result that the effective spring length or effective spring arm or range of the disk spring 14 decreases, as a result of which the spring force is increased. Through an appropriate choice of radii, it is thus possible to set a progressive force/displacement characteristic which has an advantageous effect on the operating behavior of the valve 1. For example, it is thereby possible to ensure that advantageous damping of the magnet armature 4 as it approaches the magnet core 3 is achieved.

The situation is similar in the case of the stepped embodiment of the contour shown in FIG. 2B. The graduation or height of steps S1 to S4 and the distance between them is chosen in such a way that a progressive spring travel characteristic is obtained as the contact points 16, 17 shift outward and inward, respectively, when the air gap is reduced.

By means of the advantageous, substantially complementary configuration of the contours of the end faces 11, 12, it is ensured that a particularly small air gap is obtained, as a result of which more efficient use is made of the effective magnetic forces. The end faces 11, 12 are configured in such a way that the core end face 11 is of substantially projection-type configuration and the core end face 12 is of substantially recess-type configuration. There is thus a depression in the magnet armature 4 into which the magnet core 3 penetrates by means of the projecting core end face 11 thereof.

Figure 3:
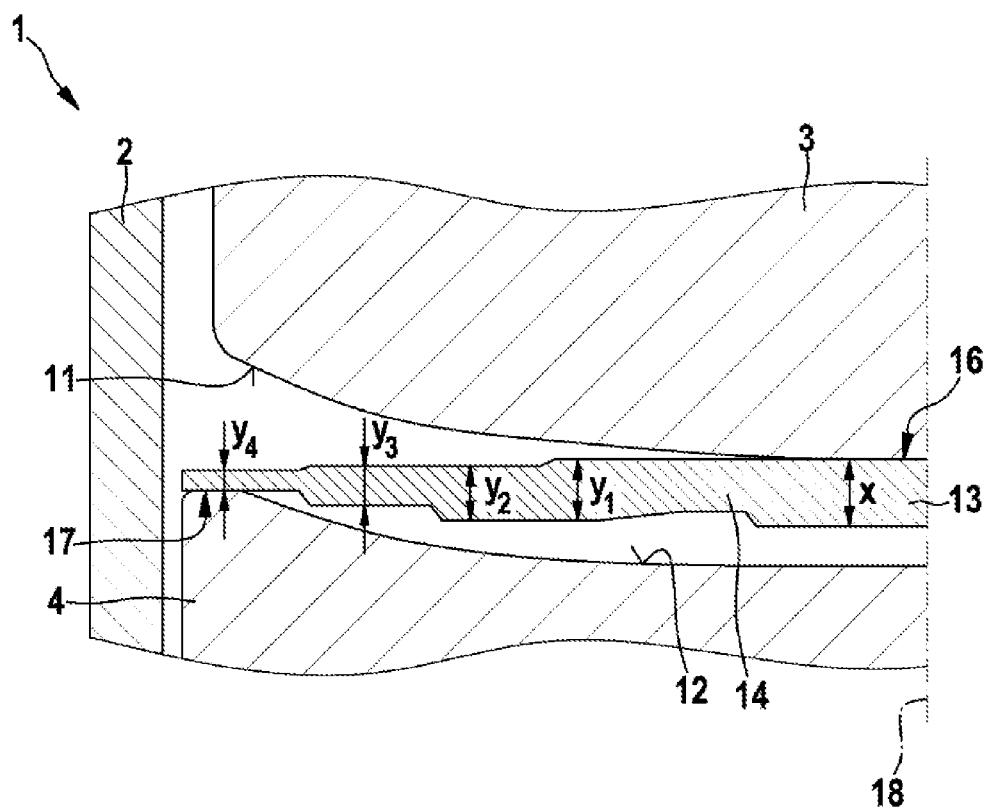
FIG. 3 shows another advantageous illustrative embodiment.

FIG. 3 shows another preferred illustrative embodiment, in which the contact points 16, 17 shift radially as a function of the distance between the magnet armature 4 and the magnet core 3. In this case, the contour of the disk spring 14 is of stepped configuration in the radial extent, while the core end face 11 and the armature end face 12 are curved, wherein the curvature essentially comprises just one radius, with the result that the armature end face 12 is of concave configuration and the core end face 11 is of convex configuration. By virtue of the stepped configuration of the contour of the disk spring 14 in the radial extent, it has different thicknesses or—when viewed in longitudinal section—heights x, y1, y2, y3 and y4. Depending on which radius the contact points 16, 17 are located, a disk spring region of different thickness acts between the magnet armature 4 and the magnet core 3, thereby affecting the force/displacement characteristic of the disk spring 14. Of course, the illustrative embodiments in FIGS. 3 and 2 can also be combined with one another in order to obtain a particularly advantageous embodiment.

According to another illustrative embodiment (not shown here), the spring element 13 is not configured as a disk spring 14 but as a diaphragm spring, which is held clamped between the curved end faces 11 and 12. Here, the contour of the end faces 11, 12 does not necessarily have to be defined by a plurality of radii or steps. On the contrary, as shown in the illustrative embodiment in FIG. 3, it is also possible for there to be a simple curvature. The shape of the diaphragm spring, which is of at least substantially conical or cone-shaped configuration when viewed in longitudinal section, ensures that the contact points 16 and/or 17 shift, with the result that, here too, different spring lever arms or spring forces act, depending on the distance between the magnet armature 4 and the magnet core 3.

It is also conceivable to provide just one step or just two radii in order to obtain just two different positions for contact point 16 and/or contact point 17. It is likewise possible for even more radii or steps to be provided on the end faces 11, 12 or the spring element 13.

The invention claimed is:

1. An electromagnetically actuated valve, comprising:
   at least one sleeve;
   a magnet core arranged in a fixed manner in the at least one sleeve;
   a magnet armature configured to actuate a valve element and arranged so as to be axially movable; and
   an elastically deformable spring element held in a clampable manner between a core end face of the magnet core facing the magnet armature and an armature end face of the magnet armature facing the magnet core,
   wherein the spring element is configured to form at least one contact point with each of the armature end face and the core end face,
   wherein a contour of at least one of the spring element, the armature end face, and the core end face is shaped in a radial extent such that a radial position of at least one of the contact points changes as a function of a distance between the armature end face and the core end face, and
   wherein the contour of the spring element defines a stepped configuration in a radial extent.

2. The valve as claimed in claim 1, wherein the contour of the at least one of the spring element, the armature end face, and the core end face is shaped such that a distance between the contact points changes as a function of the distance between the armature end face and the core end face.

3. The valve as claimed in claim 1, wherein the spring element is configured to form a contact line or a contact surface with one or more of the armature end face and the core end face, respectively.

4. The valve as claimed in claim 1, wherein the spring element is formed as a disk spring.

5. The valve as claimed in claim 4, wherein the spring element is formed as a flat disk spring.

6. The valve as claimed in claim 1, wherein the contour of the armature end face and the core end face has one of a curved configuration and a stepped configuration in the radial extent.

7. The valve as claimed in claim 1, wherein the contour of the armature end face and the core end face is a curvature having at least one radius.

8. The valve as claimed in claim 7, wherein the at least one radius includes a plurality of different radii.

9. The valve as claimed in claim 1, wherein the contour of the armature end face, and the core end face is a stepped contour having at least one successive steps equally or differently graduated and equally or differently spaced.

10. The valve as claimed in claim 9, wherein the at least one successive steps includes a plurality of successive steps.

11. The valve as claimed in claim 1, wherein the armature end face and the core end face are configured so as to be at least substantially complementary to one another.

12. The valve as claimed in claim 1, wherein the spring element is formed as a diaphragm spring and the core end face and the armature end face have one of a curved configuration and stepped configuration.

13. The valve as claimed in claim 1, wherein the valve is for hydraulic systems of motor vehicles.

14. An electromagnetically actuated valve, comprising:
    at least one sleeve;
    a magnet core arranged in a fixed manner in the at least one sleeve;
    a magnet armature configured to actuate a valve element and arranged so as to be axially movable; and
    an elastically deformable flat spring element held in a clampable manner between a core end face of the magnet core facing the magnet armature and an armature end face of the magnet armature facing the magnet core,
    wherein the spring element is configured to form at least one contact point with the armature end face, and
    wherein the armature end face defines a stepped configuration in the radial extent to provide at least three spring element contact points for contacting the spring element as the magnet core and the magnet armature move toward each other.

15. The valve as claimed in claim 14, wherein the spring element is formed as a disk spring.

16. The valve as claimed in claim 15, wherein the spring element is formed as a flat disk spring.

17. The valve as claimed in claim 14, wherein the armature end face and the core end face are configured so as to be at least substantially complementary to one another.

18. The valve as claimed in claim 14, wherein the core end face defines a stepped configuration in the radial extent to provide at least three additional spring element contact points.

19. The valve as claimed in claim 14, wherein the valve is for hydraulic systems of motor vehicles.

\* \* \* \* \*